Nov. 4, 1969 — E. A. GREASLEY — 3,476,928
VEHICULAR LAMP HOLDER
Filed Sept. 13, 1967
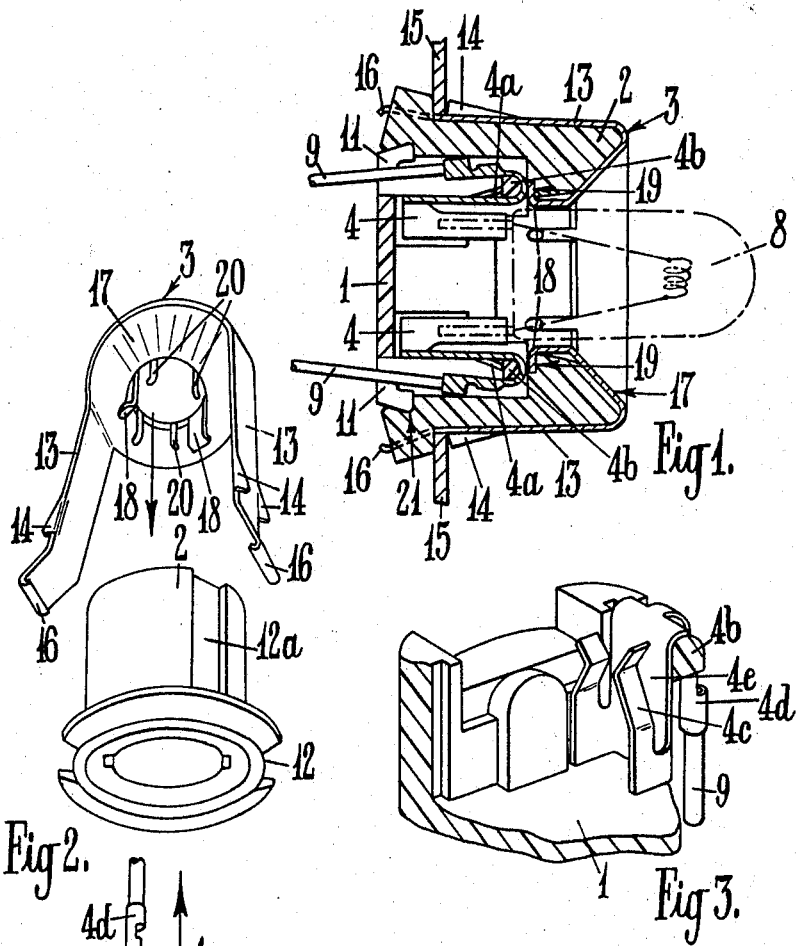
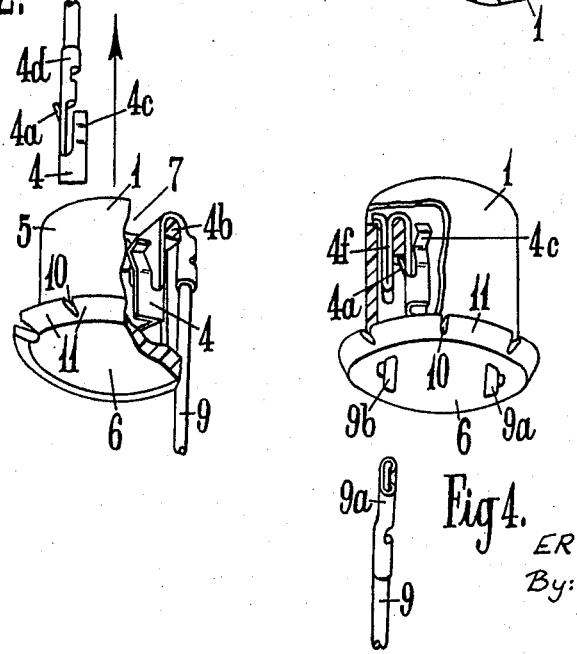
INVENTOR
ERIC ARTHUR GREASLEY
By: Kelman and Berman
Agents United States Patent Office 3,476,928
Patented Nov. 4, 1969

3,476,928
VEHICULAR LAMP HOLDER
Eric Arthur Greasley, Stapleford, England, assignor to Pressac Limited, Long Eaton, England
Filed Sept. 13, 1967, Ser. No. 667,506
Claims priority, application Great Britain, Apr. 21, 1967, 18,573/67
Int. Cl. B60q 1/30
U.S. Cl. 240—8.3     8 Claims

ABSTRACT OF THE DISCLOSURE

A lamp holder having a bulb-receiving portion and an outer casing made of thermoplastic synthetic material for capless bulbs. A shield member secures the holder in an opening in a panel. The shield serves to protect the plastic parts against the heat of the light bulb.

Background of the invention

This invention is concerned with the design of a lamp holder for high-wattage "capless" bulbs, and intended more particularly, although not exclusively, for use on automobiles. The high heat dissipation from these bulbs precludes the use of the normal thermoplastic materials for making parts of the holder, due to their low temperature melting points. A desirable feature from the automobile manufacturers' point of view is that the holder should have minimum projection into the trunk of the vehicle when used on this part of the vehicle, but should be readily removable when the bulb needs to be changed. This also applies to other like uses for the holder, e.g. when fitted to an instrument panel.

Summary of the invention

The invention consists of a lamp holder which comprises a bulb-receiving housing of thermoplastic, molded, synthetic plastics material fitted internally with bulb-engaging contacts, an outer casing also made of synthetic plastics material adapted to contain said bulb-receiving housing therein in a relatively non-movable manner, and a metallic bracket constructed to provide means for securing the holder in an opening in a supporting panel, chassis or the like, and which is adapted also to serve as a heat shield for protecting the moulding and the outer casing against the heat of said bulb when alight.

According to a preferred embodiment of the invention, the said bracket comprises a frusto-conical or parabolically shaped annular reflector portion which overlies a complementary shaped outwardly flaring front face of the casing.

Conveniently, the means on said bracket for securing the holder in an opening in a supporting panel, chassis or the like comprises springly legs which fit into longitudinal slots in the outer face of the casing, the free end portion of each leg comprising a transversely projecting abutment lug which limits insertion of a holder into an opening in a panel and so locates the holder in position, the extremities of said legs acting to resist unintentional withdrawal of the holder from said opening but facilitating such withdrawal when necessary.

Brief description of the drawings

FIGURE 1 is a cross section taken through an assembled lamp holder.

FIGURE 2 is an exploded perspective view showing the parts of the lamp holder separated.

FIGURE 3 is a perspective view drawn to a larger scale showing a fragment of the holder and illustrating how lamp contacts are fitted according to one embodiment, and FIGURE 4 is a perspective view drawn to a smaller scale.

Description of the preferred embodiments

Referring to said drawings, the lamp holder comprises four main components consisting of a bulb-receiving contact housing 1 molded of nylon or other thermoplastic synthetic plastics material, an outer casing 2 also made of nylon or other thermoplastic synthetic plastics material, a fixing bracket 3 made of springy metal such as carbon steel, and bulb engaging contacts 4.

Referring firstly to FIGURES 1 to 3, the bulb-receiving housing comprises a cylindrical body portion 5, which is closed at one end 6 and is open at its other end 7 to constitute a mouth for receiving a high-wattage "capless" bulb 8.

The housing 1 is adapted internally to receive a pair of lamp contacts 4 which can be introduced into the housing through the mouth 7 and are retained accurately in position by means of locking lugs 4a which spring outwardly under abutment ledges 4b within the housing when the contacts are inserted into the housing. The said contacts 4 are crimped to leads 9, and after the contacts 4 have been fitted in position inside the housing 1 these leads 9 are bent back through substantially 180° against the outer face of the housing 1 and through slots 10 between sections 11 of a circumferential locking flange provided at the closed end 6 of the holder.

The said contacts 4 are preferably made in bandoleer fashion, as is customary.

The outer casing 2 is formed to accept the housing 1 as a snap-in fit after the contacts 4 have been assembled, and this casing 2 is formed with a pair of location slots 12 in the outer face thereof to accept the springy legs 13 of the fixing bracket or clip and shield 3. The outer face of this casing 2 is also formed with a third slot 12a which serves as a location slot which slides over an inwardly and radially directed tongue in the edge of an opening in a panel in which the holder is fitted, to ensure that the lamp holder is correctly positioned so as to polarise the holder in the automobile rear lamp assembly, or in other equipment in which the lamp holder is incorporated. The said fixing bracket or clip 3 comprises said pair of retaining legs 13 which are each formed at their side edges with a pair of abutment lugs 14 which, as clearly shown in FIGURE 1, abut the face of a chassis member 15 of an automobile, not otherwise shown, to limit insertion of a holder into an opening and so locate the holder in position, the extremities 16 of said legs 13 acting to resist unintentional movement of the holder, but facilitating withdrawal of the latter when necessary.

The said bracket 3 also comprises a frusto-conical or parabolically shaped reflector portion 17 which overlies a complementary shaped front face of the casing 2 and which portion 17 serves as a heat barrier to the housing 1, and its outer casing 2, and this portion 17 is provided centrally with a pair of fixing lugs 18 which snap over an undercut ledge 19 in the outer casing 2, and also with four bulb locating and supporting legs 20.

When fitting the housing 1 into the outer casing 2, the sections 11 of the locking flange engage as a snap fit in an undercut recess 21 in said casing 2, and the inter-engagement of these parts serves to prevent unintentional separation of the two parts.

The said contacts 4, as clearly shown in FIGURE 3, comprise bulb-contacting legs 4c, means 4d for crimping a wire 9 to the contact and a wide spine-like portion 4e with said springy lug 4a (not visible) serving as a retention latch to engage the abutment 4b within the contact moulding.

On assembly, the fixing bracket 3 is "snapped-on" to the outer casing 2 and retained by the two centre retaining legs 18. The contacts 4, which have previously been crimped to the wires 9, are inserted into the contact housing 1 and retained by the lugs 4a. The wires and crimped portions 4d of the contacts are then bent through substantially 180° so that the wires 9 lie snugly along the outer periphery of the housing 1 and are connected to terminal portions of the contacts in the housing 1 by the respective bent bight portions. The housing is then inserted into the outer casing 2, and the sections 11 of the locking flange snapped into said undercut recess 21.

According to the modification illustrated by FIGURE 4, the bulb-receiving contacts 4 are so constructed that the need for crimping them to a wire 9 is avoided. In this respect each contact 4 is formed with a blade-like portion 4f which is constituted by bending the contact to form two thicknesses of material, and the wire is fitted with a socket-like portion 9a forming a channel or socket which can be slid over the blade-like portion 4f of a contact. To facilitate this, the end wall 6 of the housing 1 is formed with openings 9b through which said socket-like portion 9a may be inserted and engaged with the blade-like portion 4f of the contacts. According to a variation of this modification, the parts 4f may alternatively be formed as sockets and the parts 9a as blades which can be fitted into said sockets in a fraction tight manner, so as to ensure a good electrical connection.

From the foregoing it will be appreciated that the lamp holder of this invention can be made of a thermoplastic material, and that the bracket 3 shields same against the heat of the bulb. Also, the arrangement is compact and does not result in undue projection of the holder into a car trunk or instrument panel housing.

Complete insulation of the current carrying contacts is achieved by the "two piece" molded construction, and eliminates the need for a "sealing" cover.

I claim:
1. A lamp holder comprising, in combination:
 (a) a bulb-receiving housing essentially consisting of molded thermoplastic synthetic plastics material;
 (b) a plurality of bulb-engaging contacts in said housing;
 (c) an outer casing essentially consisting of molded thermoplastic synthetic plastics material;
 (d) securing means securing said housing in said casing against relative movement; and
 (e) heat-shielding means for protecting the housing and the outer casing against the heat of a bulb received by said housing when said bulb is slight, said heat shielding means including a metallic shielding member; and
 (f) bracket means integral with said shielding member and engagable with a supporting panel for securing the holder in said panel.

2. A lamp holder as claimed in claim 1, wherein said heat shielding member has an annular reflector portion and said casing has an outwardly flaring annular front face, said reflector portion overlying said front face in conforming engagement.

3. A lamp holder as claimed in claim 2, wherein said reflector portion is formed centrally with integral resilient fixing lugs, and said outer casing is formed with an undercut ledge, said lugs engaging said ledge under the resilient force thereof.

4. A lamp holder as claimed in claim 2, wherein said reflector portion is formed centrally with bulb locating and supporting legs.

5. A lamp holder as claimed in claim 2, wherein said bracket means include a plurality of resilient legs, each leg having an end potrion integrally fastened to said reflector portion and a free end portion, said casing having an outer face formed with a plurality of elongated slots respectively located to receive said legs when said legs are resiliently deformed, and an abutment lug transversely projecting from the free end portion of each leg.

6. A lamp holder as set forth in claim 1, further comprising an integral circumferential resilient locking flange on said housing, said casing being formed with an undercut recess receivig said flange as a snap fit.

7. A lamp holder as set forth in claim 1, said housing being formed with a plurality of internal abutment ledges, and said bulb-engaging contacts being formed with respective locking lugs engaging said ledges to prevent withdrawal of said contacts, each contact having a terminal portion in said housing, a circuit wire receiving portion outside said housing, said circuit wire receiving portion lying snugly against the outer periphery of said housing, and a bight portion bent through substantially 180° and connecting said terminal portion and said circuit wire receiving portion.

8. A lamp holder as set forth in claim 1, wherein one of said contacts includes engaging means in said housing for engaging a complementary part connected to a circuit wire, said housing having a closed bottom remote from said heat shielding means and formed with an opening therethrough for passage of said complementary part.

References Cited

UNITED STATES PATENTS

| | | | |
|---|---|---|---|
| 2,823,299 | 2/1958 | Squire et al. | 240—8.16 |
| 2,860,233 | 11/1958 | Johnson | 240—7.1 |
| 2,903,570 | 9/1959 | Worden | 240—7.1 |
| 3,005,907 | 10/1961 | Dupree | 240—8.16 |
| 3,246,320 | 4/1966 | Houbolt | 240—8.16 |
| 3,366,727 | 1/1968 | Rueger | 248—27 X |

NORTON ANSHER, Primary Examiner

C. E. SMITH, Assistant Examiner

U.S. Cl. X.R.

240—8.16, 73; 339—126